(12) United States Patent
Pop et al.

(10) Patent No.: US 8,346,172 B2
(45) Date of Patent: Jan. 1, 2013

(54) SYSTEMS AND METHODS PROVIDING WIDEBAND TUNERS CONTROLLING SPURIOUS SIGNAL PLACEMENT IN THE CAPTURE BANDWIDTH

(75) Inventors: Marius Pop, Richardson, TX (US); David Dessert, Wylie, TX (US)

(73) Assignee: CSR Technology Inc., Sunnyvale, CA (US)

( * ) Notice: Subject to any disclaimer, the term of this patent is extended or adjusted under 35 U.S.C. 154(b) by 889 days.

(21) Appl. No.: 12/473,092

(22) Filed: May 27, 2009

(65) Prior Publication Data
US 2010/0304677 A1  Dec. 2, 2010

(51) Int. Cl.
*H04B 1/00* (2006.01)
*H04B 17/00* (2006.01)

(52) U.S. Cl. ............... 455/63.1; 455/67.13; 455/296; 455/315; 348/725; 348/731

(58) Field of Classification Search ........... 455/63.1, 455/67.13, 150.1, 192.2, 196.1, 255, 257, 455/283, 295, 296, 310, 311, 313, 315, 317; 348/725, 726, 731, 732, 555, 556, 559; 725/131, 725/151
See application file for complete search history.

(56) References Cited

OTHER PUBLICATIONS

U.S. Appl. No. 10/952,185, Dessert et al.
U.S. Appl. No. 11/325,854, Dessert et al.
U.S. Appl. No. 11/930,703, Dessert et al.

*Primary Examiner* — Quochien B Vuong
(74) *Attorney, Agent, or Firm* — Fulbright & Jaworski L.L.P.

(57) ABSTRACT

Systems and methods which place a spurious signal within a capture bandwidth of a tuner. Placement of the spur is preferably controlled to dispose the spur within a spur placement window, such as may be defined between traffic channels of an input signal. A tuner system operating in accordance with embodiments may be controlled to select a particular input frequency band comprising a plurality of traffic channels for frequency conversion and to determine local oscillator frequencies which result in most relevant spurs being placed outside of the tuner capture bandwidth. The local oscillator frequencies may be shifted to place a relevant spur remaining within the capture bandwidth of the tuner between traffic channels of the plurality of traffic channels. Embodiments operate to determine frequency offset between a transmitter and a tuner to determine the midpoint between channels.

25 Claims, 4 Drawing Sheets

SYSTEMS AND METHODS PROVIDING WIDEBAND TUNERS CONTROLLING SPURIOUS SIGNAL PLACEMENT IN THE CAPTURE BANDWIDTH

CROSS-REFERENCE TO RELATED APPLICATIONS

This application is related to co-pending and commonly assigned U.S. patent application Ser. No. 11/486,706 entitled "Broadband Integrated Tuner," filed Jun. 29, 2006, Ser. No. 11/325,854 entitled "System and Method for Discovering Frequency Related Spurs in a Multi-Conversion Tuner," filed Jan. 5, 2006, Ser. No. 10/952,185 entitled "System and Method of Eliminating or Minimizing LO-Related Interference from Tuners," filed Sep. 28, 2004, and Ser. No. 11/930,703 entitled "System and Method of Eliminating or Minimizing LO-Related Interference from Tuners," filed Oct. 31, 2007, Ser. No. 11/557,365 entitled "High-Performance Bipolar Tuner Solution Systems and Methods," filed Nov. 7, 2006, Ser. No. 11/613,079 entitled "Suppression of LO-Related Interference from Tuners," filed Dec. 19, 2006, the disclosures of which are hereby incorporated herein by reference.

TECHNICAL FIELD

The present invention is related generally to frequency conversion and, more particularly, to wideband tuners controlling placement of one or more spurious signal components in the tuner capture bandwidth.

BACKGROUND OF THE INVENTION

Devices are in wide use today which receive and/or transmit information, including audio, video, data, etc., via radio frequency (RF) communication links. For example, cable transmission systems have become widely utilized to provide broadband communication of television signals, computer networking signals, voice over Internet protocol (VoIP) signals, and the like on a plurality of channels spread across a broad spectrum (e.g., 6 MHz or 8 MHz channels in the spectrum from 50 MHz to 1,000 MHz). Various devices, such as set-top-boxes, cable modems, television receivers, personal computer televisions (PCTV), and other customer premise equipment (CPE) devices have been employed for use with respect to such signals.

Such CPE devices often include a RF tuner (frequency converter), a demodulator, and an interface to other CPE devices, such as a network router, a network access point (AP), a personal computer (PC), a television set, etc. Such a RF tuner may be operated to select a subset of the channels out of the plurality of channels in the transmission spectrum from an input, such as an antenna input or cable input. The demodulator may then be operated to convert the single channel data from the tuner to a raw data output, usually baseband. The aforementioned interface, such as may comprise a PC interface or bridge, may operate to transport the raw data to a CPE, such as a PC, for the intended use.

Although the aforementioned channel selection has traditionally selected a single channel, more recently developed systems have been designed to select a plurality of channels, such as a block of contiguous channels, within the transmission spectrum. For example, version 3.0 of the Data Over Cable Service Interface Specification (DOCSIS) specifies tuners are to be sufficiently wideband to frequency convert no less than a 64 MHz block of spectrum and as much as a 96 MHz block of spectrum (i.e., provide no less than 64 MHz capture bandwidth and as much as 96 MHz capture bandwidth).

In operation of a RF tuner, an incoming signal at frequency $f_{IN}$ is mixed with a signal at frequency $f_{LO1}$ from a local oscillator (LO) to produce a signal at a first intermediate frequency $f_{IF1}$. In a dual conversion tuner configuration, this signal may then mixed with a signal at frequency $f_{LO2}$ from a second local oscillator signal to produce a second intermediate frequency $f_{IF2}$, such as for providing to a demodulator.

The foregoing frequency conversion process is illustrated in FIG. 1, wherein exemplary dual conversion tuner 100 is shown. In operation of tuner 100, the $f_{LO}$ signals (provided by LO 121 and LO 131) are mixed by respective mixers (mixer 120 and mixer 130) to frequency convert the input signal, $f_{IN}$, to an intermediate frequency, $f_{IF2}$, for providing to demodulator 140.

First IF filter 111 and second IF filter 112 provide filtering of the frequency converted signals output by the mixers. Accordingly, these filters ultimately determine capture bandwidth (CBW) of the tuner, here the bandwidth of $f_{IF2}$. For example, the CBW of tuner 100 will be no broader than the convolution of filter 111 and filter 112). Of course, mixers 120 and 130 and other circuitry of tuner 100 must provide acceptable operation (e.g., linear operation, spurious signal suppression and/or avoidance, etc.) throughout a bandwidth consistent with the capture bandwidth defined by such filters for the tuner to actually provide the capture bandwidth.

An adverse effect of the dual conversion process of tuner 100 is the introduction of LO-related spurious signals, or "spurs," into the tuned signal. These spurs are created by combinations of the harmonics of the LO frequencies used ($f_{LO1}$ and $f_{LO2}$). Because broader capture bandwidths result in more such spurious signals potentially falling within the capture bandwidth, as explained more fully below, traditional tuner circuits have been unable to provide capture bandwidths on the order of 64 MHz to 96 MHz as set forth in the DOCSIS 3.0 standard which otherwise meet signal quality requirements.

The frequency of each of the LO-related spurs can be calculated as:

$$f_{SPUR} = \pm n f_{LO1} \pm m f_{LO2} \qquad (1)$$

where n and m are integer numbers representing, respectively the harmonics of the high and low local oscillator frequencies, and f1 and f2 are the local oscillator frequencies (e.g., $f_{LO1}$ and $f_{LO2}$, respectively where $f_{LO1} > f_{LO2}$).

A spur generated by a given combination of $f_{LO1}$ and $f_{LO2}$ that falls within the capture bandwidth (CBW) of tuner 100 can degrade the quality of the output signal. In particular, a spur which is generated by multiples of $f_{LO1}$ and $f_{LO2}$ in a double conversion system will often have an amplitude (power level) which degrades the signal to noise and distortion (SINAD) ratio. Therefore, if such a spur falls within the capture bandwidth of a typical tuner circuit, its amplitude SN12 may corrupt the performance of the tuner itself.

BRIEF SUMMARY OF THE INVENTION

The present invention is directed to systems and methods which place a spurious signal or spur within a capture bandwidth of a tuner. Embodiments of the invention operate to place a spur falling within the capture bandwidth of a tuner within a spur placement window, such as may dispose the spur between traffic channels. Accordingly, rather than adjusting local oscillator frequencies so as to cause all relevant spurs (i.e., those spurs having sufficient amplitude and/ or other attributes to degrade the output signal beyond acceptable parameters) outside of the capture bandwidth, embodiments of the invention place at least one such spur within the capture bandwidth. Such embodiments preferably shift one or more local oscillator frequency to place the aforementioned one or more spur within a predetermined spur placement window between traffic channels. Accordingly, embodiments of the invention thus provide wideband tuner configurations with maximized capture bandwidths.

A tuner system operating in accordance with an embodiment of the invention may be controlled to select a particular input frequency band comprising a plurality of traffic channels for frequency conversion. Algorithms may be utilized to determine LO frequencies which result in most relevant spurs being placed outside of the capture bandwidth of the tuner. The LO frequencies are shifted to place a relevant spur remaining within the capture bandwidth of the tuner between traffic channels of the plurality of traffic channels. The foregoing LO frequency shift is preferably no greater than one-half the maximum channel width of the selected input frequency band. For example, where the traffic channels comprise 6 MHz channels, such as is the case in the cable plants commonly used in the United States, a frequency shift no greater than 3 MHz may be utilized to place the remaining relevant spur between traffic channels. Similarly, where the traffic channels comprise 8 MHz channels, such as is the case in the cable plants commonly used in Europe, a frequency shift no greater than 4 MHz may be utilized to place the remaining relevant spur between traffic channels.

Embodiments of the invention preferably precisely place a remaining relevant spur within the capture band of the tuner. For example, in order to provide optimum mitigation of a remaining relevant spur and/or to accommodate relatively large amplitude spurs using roll-off associated with the skirts or edges of traffic channels, embodiments of the invention operate to place a remaining relevant spur within a predetermined range of the midpoint between adjacent channels, such as within ±25 KHz of the midpoint.

The midpoint between channels is typically not precisely known by tuner circuitry. For example, tuner circuitry (e.g., local oscillators or other circuitry providing frequency information) typically runs independent of the circuitry transmitting the signals, and thus tuners are typically not synchronized with the transmitted signal. Moreover, appreciable channel drift or other phenomena may be associated with the transmission of the signal. Accordingly, embodiments of the invention operate to precisely determine the midpoint between channels. For example, embodiments of the invention determine frequency error between the signal transmitter and the tuner oscillators for determining frequency offset and thus channel midpoint location. Using such frequency offset information, embodiments of the invention determine LO frequency shift to place a remaining relevant spur between traffic channels to within an acceptable level of tolerance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
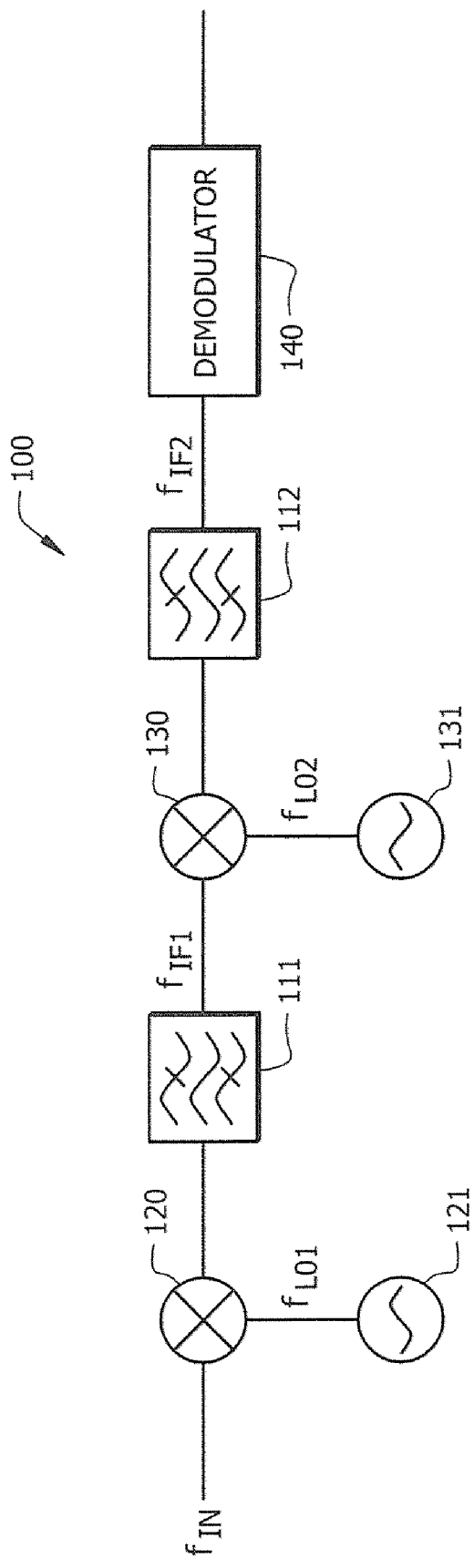
FIG. 1 shows a dual conversion tuner system in accordance with the prior art.
Figure 2:
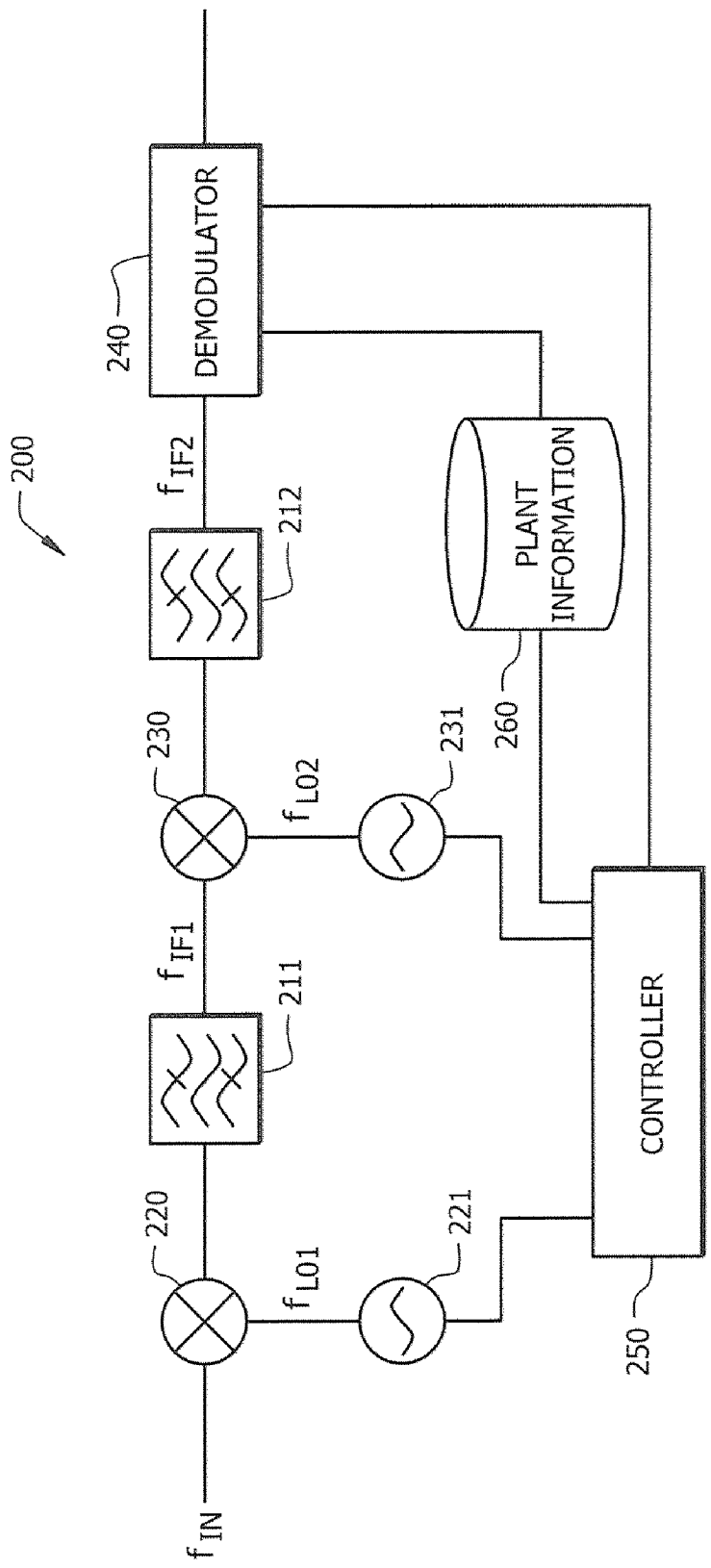
FIG. 2 shows a dual conversion tuner system in accordance with embodiments of the present invention.

FIG. 2 shows an exemplary embodiment of a dual conversion tuner adapted in accordance with the concepts of the present invention as tuner 200. Tuner 200 of the illustrated embodiment includes mixer 220 and associated LO 221, filter 211, mixer 230 and associated LO 231, filter 212, and demodulator 240. In operation of tuner 200, the $f_{LO}$ signals (provided by LO 221 and LO 231) are mixed by respective mixers (mixer 220 and mixer 230) to frequency convert the input signal, $f_{IN}$, to an intermediate frequency, $f_{IF2}$, for providing to demodulator 240. Additional detail with respect to frequency conversion operation provided by such a dual conversion tuner is shown in U.S. Pat. No. 5,737,035, issued Apr. 7, 1998 hereby incorporated herein by reference.

First IF filter 211 and second IF filter 212, preferably comprising bandpass filters, provide filtering of the IF signals $f_{IF1}$ and $f_{IF2}$. Accordingly, these filters ultimately determine capture bandwidth (CBW) of the tuner (e.g., the CBW of tuner 200 will be the convolution of filter 211 and filter 212). Tuner 200 of embodiments is wideband, providing frequency conversion meeting DOCSIS 3.0 wideband tuner requirements. For example, embodiments of tuner 200 provide frequency conversion of no less than a 64 MHz block of spectrum. Certain embodiments of tuner 200 provide frequency conversion of a 96 MHz block of spectrum, or more. Thus filters 211 and 212 of embodiments convolve to provide no less than 64 MHz, with some embodiments convolving to provide capture bandwidth and as much as 96 MHz, etc. Mixers 220 and 230 and other circuitry of tuner 200 are adapted to provide wideband operation consistent with the foregoing capture bandwidth.

Figure 3:
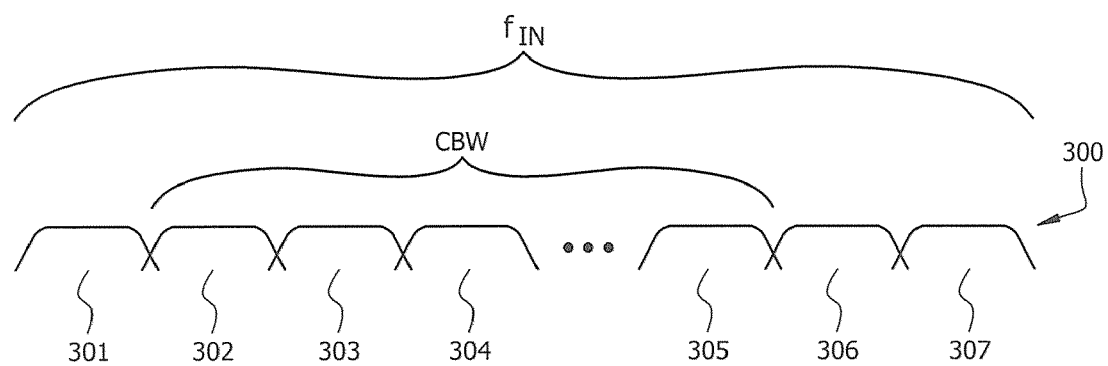
FIG. 3 illustrates channel layout information for a broadband signal as may be provided as an input to the tuner system of FIG. 2.

In operation according to embodiments of the invention, tuner 200 provides simultaneous frequency conversion of a plurality of traffic channels where the input signal comprises a broadband cable transmission signal comprising a plurality of traffic channels as illustrated by broadband signal 300 of FIG. 3. For example, where the signal input as $f_{IN}$ comprises a broadband cable transmission signal having a plurality of adjacent 6 MHz traffic channels (e.g., channels 301-307 of FIG. 3 each comprise a 6 MHz traffic channel), the foregoing capture bandwidths may comprise from 10 to 16 traffic channels. Similarly, where the signal input as $f_{IN}$ comprises a broadband cable transmission signal having a plurality of adjacent 8 MHz traffic channels (e.g., channels 301-307 each comprise a 8 MHz traffic channel), the foregoing capture bandwidth may comprise from 8 to 12 channels. Of course, such capture bandwidths may comprise any number of channels, particularly where different channel widths and/or mixed channel widths are used.

Controller 250 of embodiments of the invention comprises a processor-based system, having a processor, memory, and input and output interfaces, suitable for proving operation as described herein. In accordance with embodiments, controller 250 operates under control of an instruction set to control LO 221 and LO 231 to provide LO frequencies, $f_{LO1}$ and $f_{LO2}$, for converting particular traffic channels appearing within $f_{IN}$ to fall within the CBW defined by filters 211 and 212. Specifically, the output of mixer 220 of embodiments is $f_{LO1}+f_{IN}$ and $f_{LO1}-f_{IN}$. Assuming, for this example, that filter 211 passes $f_{LO1}-f_{IN}$, and attenuates $f_{LO1}+f_{IN}$ (i.e., mixer 220 and filter 211 provide a subtractive mixer circuit), $f_{IF1}=f_{LO1}-f_{IN}$. Filter 211 preferably provides attenuation of a portion of a broadband signal comprising $f_{IN}$. For example, $f_{IN}$ may comprise a broadband cable transmission signal (e.g., 50 MHz to 1,000 MHz) comprising a plurality of traffic channels as shown in FIG. 3, wherein filter 211 passes a portion of this bandwidth (e.g., a 104 MHz band centered at $f_{IF1}$). Accordingly, controller 250 of embodiments controls LO 221 to select the frequency $f_{LO1}$ such that the particular traffic channels of interest fall within the passband (e.g., 104 MHz band centered at $f_{IF1}$) of filter 211. The output of mixer 230 of embodiments is $f_{IF1}+f_{LO2}$ and $f_{IF1}-f_{LO2}$. Assuming, for this example, that filter 212 passes $f_{IF1}-f_{LO2}$, and attenuates $f_{IF1}+f_{LO2}$ (i.e., mixer 230 and filter 212 provide a subtractive mixer circuit), $f_{IF2}=f_{IF1}-f_{LO2}=(f_{LO1}-f_{IN})-f_{LO2}$. Filter 212 may provide a more narrow passband than filter 211, such as to more closely correspond to a desired CBW (e.g., 96 MHz). Accordingly, controller 250 of embodiments controls LO 231 to select the frequency $f_{LO2}$ such that the particular traffic channels of interest fall within a passband (e.g., a 96 MHz band centered at $f_{IF12}$) of filter 212.

It should be appreciated that the passband of filter 211 in the above example is wider than the passband of filter 212 (i.e., 104 MHz is greater than 96 MHz). This is to accommodate movement of the LO frequencies for controlling spur placement as described herein, as will be better understood from the discussion below.

As previously mentioned, the dual conversion process introduces LO-related spurious signals, or "spurs," into the tuned signal. These spurs are created by combinations of the harmonics of the LO frequencies used ($f_{LO1}$ and $f_{LO2}$). A spur generated by a given combination of $f_{LO1}$ and $f_{LO2}$ that falls within the CBW of tuner 200 can degrade the quality of the output signal. Accordingly, controller 250 preferably operates not only to determine LO frequencies ($f_{LO1}$ and $f_{LO2}$) which result in the particular channels of interest falling within the passbands of filters 211 and 212, thus falling in the CBW of tuner 200, but also to determine LO frequencies which result in most relevant spurs being placed outside of the CBW of the tuner. For example, algorithms of controller 250 may calculate LO related spurs, such as up to a particular order (e.g., permeations up to n=15 and m=15 in equation (1)), to select a LO frequency combination which places relevant spurs (i.e., those spurs having sufficient amplitude to degrade the output signal beyond acceptable parameters) outside of the CBW of tuner 200. Techniques for selecting LO frequencies to place spurs outside of a tuner capture bandwidth are shown in the above referenced patent applications entitled "System and Method for Discovering Frequency Related Spurs in a Multi-Conversion Tuner," "System and Method of Eliminating or Minimizing LO-Related Interference from Tuners," and "System and Method of Eliminating or Minimizing LO-Related Interference from Tuners."

The number of LO frequency combinations that can possibly create spurs in n harmonics is $n^2$. Accordingly, it may not be possible to adjust the LO frequencies to avoid one or more spur, having sufficient amplitude to degrade the output signal below system requirements, falling within the CBW, particularly where a tuner is wideband as with exemplary tuner 200 discussed above.

Algorithms of controller 250 of embodiments thus operate to determine LO frequencies which result in most relevant spurs being placed outside of the CBW of tuner 200 and determines a LO frequency shift to place a remaining relevant spur within the CBW of the tuner so as to mitigate or minimize its impact upon the tuner output. Specifically, embodiments of the invention place a relevant spur remaining in the CBW between traffic channels as illustrated by spur 401 in FIG. 4. Preferred embodiments operate to provide shifting of remaining relevant spurs toward the lower frequency edge of a first IF filter, such as filter 211, to obtain advantages associated with performance of components of the tuner, such as tuner 200.

Figure 4:
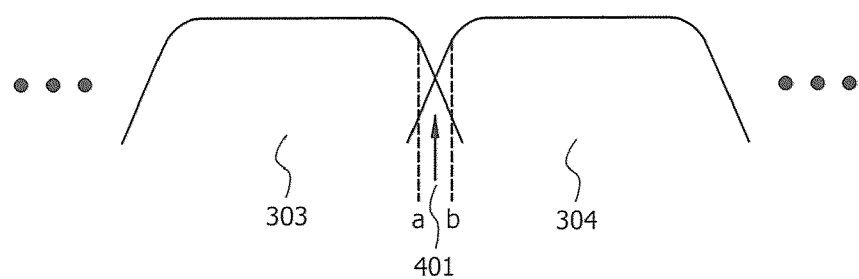
FIG. 4 shows a spur placement window as may be implemented according to embodiments of the invention.

In order to provide optimum mitigation of a remaining relevant spur and/or to accommodate relatively large amplitude spurs using roll-off associated with the skirts or edges of traffic channels, embodiments of the invention operate to place a remaining relevant spur within a predetermined range of the midpoint between adjacent channels (represented as range spur placement window a-b in FIG. 4). Experimentation has revealed that the roll-off associated with the skirts or edges of typical traffic channels, such as the 6 MHz and 8 MHz traffic channels of the cable plants typical to the United States and Europe, provide as much as 25 dB of rejection within ±25 KHz of the midpoint between the traffic channels. Experimentation has further revealed that a LO related spur which remains within the CBW often fail system performance requirements (e.g., DOCSIS 3.0 performance specifications) by 10 dB. Accordingly, embodiments of the invention operate to place a remaining relevant spur within ±25 KHz of the midpoint between traffic channels.

The foregoing placement of a relevant spur remaining within the CBW may be accomplished according to embodiments of the invention with a LO shift of no more than one-half the maximum channel width of the selected input frequency band. For example, where the traffic channels comprise 6 MHz channels and the remaining relevant spur falls at the center frequency of a traffic channel, a LO frequency shift of ±3 MHz may be utilized to place the remaining relevant spur at the upper (+3 MHz) or lower (−3 MHz) edge of the traffic channel. Where the remaining relevant spur falls at a frequency lower than the center frequency of a 6 MHz traffic channel, a LO frequency shift of less than −3 MHz may be utilized to place the remaining relevant spur at the lower edge of the traffic channel. Similarly, where the remaining relevant spur falls at a frequency higher than the center frequency of a 6 MHz traffic channel, a LO frequency shift of less than +3 MHz may be utilized to place the remaining relevant spur at the upper edge of the traffic channel. Frequency shifts of less than or equal to ±4 MHz may be utilized to place the remaining relevant spur between traffic channels where the traffic channels comprise 8 MHz channels.

The passbands of filter 211 and/or filter 212 are preferably adapted to accommodate the foregoing frequency shift. That is, the passband of one or more of the filters of tuner 200 is sufficiently wideband to pass the desired frequency band as well as to accommodate shifting of the frequency band for disposing one or more spurs between traffic channels. For example, where tuner 200 provides frequency conversion meeting DOCSIS 3 wideband tuner requirements to provide frequency conversion of a 96 MHz block of spectrum, the passband of filter 211 may be 104 MHz (e.g., the desired 96 MHz frequency conversion bandwidth plus 4 MHz to accommodate frequency shifts up to one-half of an 8 MHz channel width) to accommodate movement of the LO frequencies for controlling spur placement as described herein.

In order to place a remaining relevant spur between traffic channels, embodiments of controller 250 utilize information regarding the channel layout (e.g., the channel width(s), the channel frequencies, the channel spacing, etc.) of the signal processed by tuner 200. For example, embodiments of the invention utilize a cable plant database, such as may be stored by database 260, to obtain information regarding the channels within the input signal. Additionally or alternatively, such channel information may be determined from the input signal, such as through controller 250 causing tuner 200 to scan the frequencies and obtaining information from demodulator 240 when a channel lock is obtained. Such scanning may be utilized to build or supplement a database of channel information, such as may be stored in database 260.

By knowing the frequency of a remaining relevant spur and information regarding the particular channels tuned to be within the CBW, controller 250 of embodiments may determine a LO frequency shift suitable for placing the remaining relevant spur between channels. However, it should be appreciated that the oscillator frequencies of a tuner, such as tuner 200, typically are not synchronous with the oscillator frequencies of a source of the input signal, such as a cable head-end system. Accordingly, channel layout information, such as the aforementioned cable plant database, may not provide sufficient information for placing a remaining relevant spur between channels to result in satisfactory mitigation of the spur. That is, a frequency offset (referred to herein as Δf) may exist between a source of the signal and the tuner receiving the signal, such that the channel edges as determined from the channel layout information are actually offset by the amount of this offset (±Δf).

Accordingly, embodiments of the invention operate to precisely determine channel location information, or tuner offset, to precisely determine the midpoint between channels. For example, embodiments of the invention utilize algorithms under which controller 250 causes tuner 200 to scan the frequencies and obtain information from demodulator 240 when a channel lock is obtained. The frequency offset may be determined for each channel or some select subset of channels, such as the highest and/or lowest and/or mid frequency channels. For example, it is expected that the frequency offset will be the greatest for the highest frequency channels, and thus a highest frequency channel may be analyzed to determine a frequency shift to be utilized with respect to all channels. Regardless of the particular channels analyzed or scanned, the frequency offset between the signal transmitter and the tuner oscillators (Δf) may be determined from the LO frequencies at which the channel lock was accomplished. Applying this frequency offset information to channel location information, such as the aforementioned cable plant database, provides accurate channel midpoint location information according to embodiments of the invention.

Using the foregoing frequency offset information, embodiments of the invention determine LO frequency shift to place a remaining relevant spur between traffic channels to within an acceptable level of tolerance. For example, embodiments of the invention operate to place a remaining relevant spur within ±25 KHz of the midpoint (i.e., a 50 KHz window) between traffic channels using the foregoing frequency offset information. Of course, other sizes of spur placement windows may be utilized in accordance with the concepts of the present invention, such as where more or less spur attenuation is desired or may be accommodated, where spurs of more or less magnitude are to be accommodated, where more or less accuracy in determining tuner offset is provided, etc.

The tuner offset information may additionally or alternatively be used to adjust a system reference oscillator (SRO) used in generating the LO frequencies. For example, the tuner offset information may be stored over some period of time and, if found to be relatively constant, the SRO may be adjusted so as to avoid implementing the foregoing LO frequency shifts, while still providing precise placement of spurs between channels as described herein. Such embodiments may be particularly desirable for use with respect to systems for which rapid initial start up of a tuner or modem is desired. For example, because the SRO is adjusted for the detected frequency offset, determining a frequency offset and shifting LO frequencies, such as may be performed at modem power-up initialization and/or at other times, may be avoided. Of course, such embodiments may operate to detect frequency offset, such as periodically, to compensate for drift (e.g., age or temperature related drift), changes in the network, etc.

Figure 5:
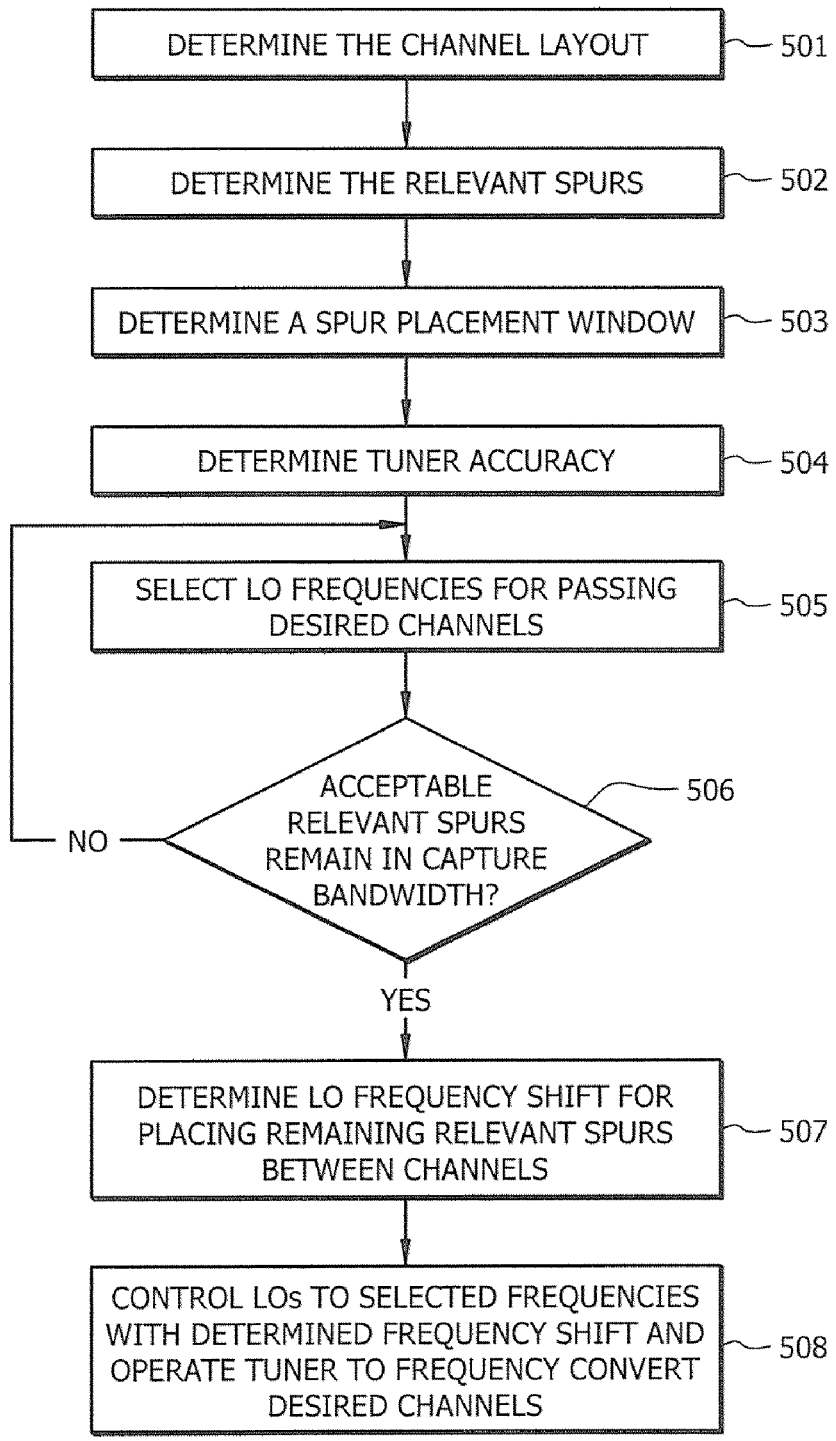
FIG. 5 shows a flow diagram of operation of the tuner system of FIG. 2 to control spurious signal placement within the capture bandwidth of the tuner.

Directing attention to FIG. 5, a flow diagram showing operation of tuner 200 to provide wideband operation as described herein is shown in accordance with embodiments of the invention. At block 503 of the illustrated embodiment channel layout information for the input signal of tuner 200 is determined. For example, a cable plant database may be provided (e.g., in database 260) where a fixed channel scheme is to be used. Additionally or alternatively, channel layout information may be determined by controller 250 through analysis of the input signal, such as where dynamic, or otherwise changing, channel schemes are implemented. Accordingly, it should be appreciated that channel layout information may be determined at any appropriate time, such as at a time of manufacturing the tuner, at a time of deployment of the tuner, in real-time during operation of the tuner, periodically, etc. At block 501 of the illustrated embodiment the relevant spurs, or those spurs which are believed to result in degradation of the output signal beyond acceptable parameters if falling within the CBW, are identified for the particular tuner configuration. Attributes of tuner 200, such as desired performance parameters, tuner configuration, density of components used in the tuner, particular manufacturing processes used to produce components used in the tuner, etc., may result in particular spurs being relevant with respect to an implementation.

$$\left(\text{i.e., } \frac{n=-2}{m=+3}, \frac{n=-4}{m=+7}\right)$$

Accordingly, at block 501 of the illustrated embodiment the relevant spurs for the expected or current implementation of tuner 200 are determined. It should be appreciated that the relevant spurs may be determined at any appropriate time, such as at a time of manufacturing the tuner, at a time of deployment of the tuner, in real-time during operation of the tuner, periodically, etc.

At block 502 of the illustrated embodiment a spur placement window within which relevant spurs remaining in the CBW of tuner 200 are to be placed. Embodiments of the invention utilized the 25 dB of attenuation provided within ±25 KHz of the midpoint between traffic channels to provide mitigation of remaining relevant spurs. Such embodiments may thus determine 50 KHz spur placement windows are available between channels of the input signal. Alternative embodiments of the invention may utilize additional or alternative spur placement windows, as desired. Spur placement windows may be determined at any appropriate time, such as at a time of manufacturing the tuner, at a time of deployment of the tuner, in real-time during operation of the tuner, periodically, etc.

At block 504 of the illustrated embodiment frequency offset ($\Delta f$) associated with tuner offset is determined. For example, controller 250 may operate tuner 200 to scan the frequencies and obtain information regarding the channels present in the input signal, such as by identifying when demodulator 240 obtains channel locks. The frequency offset between the signal transmitter and tuner 200 may thus be determined from the LO frequencies at which the channel lock was accomplished. The foregoing frequency offset may be determined at one or more times, such as periodically, to accommodate tuner frequency errors frequency drift, thermally related changes, etc.

At block 505 of the illustrated embodiment a desired frequency band or channels to be tuned from the input signal has been identified and thus LO frequencies for LO 221 and LO 231 to cause tuner 200 to pass the identified frequency band are selected, such as through operation of controller 250. It should be appreciated that various combinations of LO frequencies may be used to align the desired channels so as to pass filters 211 and 212 after frequency translation by mixers 220 and 230. However, each such combination of LO frequencies has associated therewith a unique combination of spurs. Embodiments of the invention employ techniques, such as those described in the above referenced patent applications entitled "System and Method for Discovering Frequency Related Spurs in a Multi-Conversion Tuner," "System and Method of Eliminating or Minimizing LO-Related Interference from Tuners," and "System and Method of Eliminating or Minimizing LO-Related Interference from Tuners" to select LO frequencies wherein such spurs are placed outside of the passband of filters 211 and 212, and thus fall outside of the CBW of tuner 200. Even using such techniques to place relevant spurs outside of the CBW of the tuner, depending upon the particular LO frequencies selected and the CBW of the tuner, one or more relevant spurs may nevertheless fall within the CBW of tuner 200.

Accordingly, at block 506 of the illustrated embodiment a determination is made, such as through operation of controller 250, as to whether acceptable relevant spurs associated with the selected LO frequencies fall within the CBW of tuner 200. Embodiments operate to determine if one or more relevant spurs fall within the CBW and, if so, whether the effects of the one or more spurs may be mitigated through LO frequency shifting as described herein. For example, where one relevant spur of the selected LO frequencies remains within the CBW of tuner 200, and the magnitude of that remaining relevant spur is such that the attenuation associated with a spur placement window will meet the operating parameters of tuner 200, the remaining relevant spur may be accommodated.

Depending upon the accuracy to which frequency offset ($\Delta f$) is determined, embodiments may operate to accommodate a plurality of relevant spurs remaining within the CBW of the tuner, even where those remaining relevant spurs are not spaced in integer multiples of the channel spacing. To aid in understanding such an embodiment of the invention, assume that at least 25 dB of attenuation is provided throughout a 50 KHz spur placement window centered between traffic channels of a typical cable plant. Relevant spurs of up to 25 dB falling within the CBW may be accommodated in the foregoing example which are interspaced (separated in frequency) from one another by an integer multiple of the channel spacing plus or minus twice the spur placement window size (e.g., remaining relevant spurs may be accommodated which have interspacing=i(6 MHz)±2(25 KHz), where i is an integer, 6 MHz is the channel spacing, and 50 KHz is the spur placement window size). Accordingly, where a plurality of relevant spurs of the selected LO frequencies remain within the CBW of tuner 200, and their magnitude and interspacing is such that the attenuation associated with the spur placement windows will meet the operating parameters of tuner 200, the remaining relevant spurs may be accommodated according to embodiments of the invention.

If, at block 506, it is determined that one or more relevant spur other than acceptable relevant spurs fall within the CBW of tuner 200, processing according to the illustrated embodiment returns to block 505 for selection of different LO frequencies for passing the desired channels. However, if it is determined that the relevant spurs falling within the CBW of tuner 200 are acceptable for remaining in the CBW according to the concepts of the invention, processing according to the illustrated embodiment proceeds to block 507.

At block 507 of the illustrated embodiment a LO frequency shift for placing the one or more remaining relevant spurs within spur placement windows is determined, such as through operation of controller 250. For example, controller 250 may use information regarding the frequency of a remaining relevant spur and information regarding the particular channels tuned to be within the CBW to determine a LO frequency shift suitable for placing the remaining relevant spur between channels.

At block 508 of the illustrated embodiment LOs 221 and 232 are controlled to operate at the selected LO frequencies and cause mixers 220 and 230, respectively, to frequency convert a portion of a signal input to tuner 200 so that the desired channels are passed by filters 211 while the relevant spurs associated with the LO frequencies are either placed outside of the CBW of tuner 200 or are shifted to fall within a spur placement window within the CBW. Accordingly, tuner 200 provides wideband tuning of signals, such as to provide a CBW on the order of 96 MHz, while avoiding and/or mitigating spurs sufficiently to provide output signals meeting desired output characteristics, such as those specified by DOCSIS 3.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    selecting a first and second local oscillator frequency combination for frequency converting a plurality of channels to a capture bandwidth of a tuner, wherein the selected first and second local oscillator frequencies have a spurious signal associated therewith which falls within the tuner capture bandwidth, and wherein the spurious signal has an attribute sufficient to degrade a signal output by the tuner outside of at least one acceptable tuner performance parameter and thus comprises a relevant spurious signal remaining within the tuner capture bandwidth;
    selecting a frequency shift for at least one of the first and second local oscillator frequencies to dispose the relevant spurious signal between two adjacent channels of the plurality of channels; and
    controlling first and second local oscillators to provide the first and second local oscillator frequencies in accordance with the selected frequency shift to dispose the relevant spurious signal between the two adjacent channels.

2. The method of claim 1, wherein the frequency shift selected is no greater than one-half a channel width of a channel of the two adjacent channels.

3. The method of claim 1, further comprising:
    determining a frequency window between channels of the plurality of channels that provides desirable attenuation, wherein the selecting a frequency shift selects a frequency shift to dispose the relevant spurious signal within the frequency window between the two adjacent channels.

4. The method of claim 3, wherein the plurality of channels comprise traffic channels of a cable plant, and wherein the frequency window comprises a 50 KHz window centered at a midpoint between adjacent traffic channels.

5. The method of claim 3, further comprising:
    determining a frequency offset between a source transmitting the plurality of channels and the tuner, wherein the selecting a frequency shift compensates for the frequency offset.

6. The method of claim 1, further comprising:
    determining channel location information for the plurality of channels, wherein the selecting a frequency shift uses the channel location information for disposing the relevant spurious signal between the two adjacent channels.

7. The method of claim 6, wherein the determining channel location information comprises:
    analyzing cable plant information.

8. The method of claim 6, wherein the determining channel location information comprises:
    scanning at least a portion of the plurality of channels to obtain channel location information.

9. A system comprising:
    a first mixer;
    a first local oscillator coupled to the first mixer and providing a first local oscillator frequency thereto,
    a second mixer disposed in a signal output path of the first mixer, the first and second mixers configured to provide a multi-conversion tuner;
    a second local oscillator coupled to the second mixer and providing a second local oscillator frequency thereto;
    at least one filter disposed in the signal output path of the first mixer, the at least one filter defining a capture bandwidth of the tuner; and
    a controller coupled to the first and second local oscillators operable to select the first and second local oscillator frequencies frequency converting a plurality of channels to the capture bandwidth of the tuner, wherein the selected first and second local oscillator frequencies have a spurious signal associated therewith which falls within the tuner capture bandwidth, and wherein the spurious signal has an attribute sufficient to degrade a signal output by the tuner outside of at least one acceptable tuner performance parameter and thus comprises a relevant spurious signal remaining within the tuner capture bandwidth, the controller further operable to select a frequency shift for at least one of the first and second local oscillator frequencies to dispose the relevant spurious signal between two adjacent channels of the plurality of channels.

10. The system of claim 9, wherein the tuner capture bandwidth comprises a bandwidth of at least 64 MHz.

11. The system of claim 9, wherein the tuner capture bandwidth comprises a bandwidth of at least 96 MHz.

12. The system of claim 9, wherein the frequency shift selected is no greater than one-half a channel width of a channel of the two adjacent channels.

13. The system of claim 12, wherein the plurality of channels comprise 6 MHz channels of a cable transmission system, and wherein the frequency shift is no greater than 3 MHz.

14. The system of claim 12, wherein the plurality of channels comprise 8 MHz channels of a cable transmission system, and wherein the frequency shift is no greater than 4 MHz.

15. The system of claim 9, further comprising:
    a frequency window predetermined for providing spurious signal attenuation, wherein the frequency shift selected by the controller disposes the relevant spurious signal within the frequency window between the two adjacent channels.

16. The system of claim 15, wherein the plurality of channels comprise traffic channels of a cable plant, and wherein the frequency window comprises a 50 KHz window centered at a midpoint between adjacent traffic channels.

17. The system of claim 15, further comprising:
    a frequency offset determined from a tuner error of the tuner, wherein the frequency shift selected by the controller is compensated for the frequency offset.

18. The system of claim 9, further comprising:
    channel location information for the plurality of channels, wherein the controller utilizes the channel location information in selecting the frequency shift.

19. The system of claim 18, wherein the channel location information comprises a cable plant database.

20. The system of claim 18, wherein the channel location information comprises information obtained by the controller scanning at least a portion of the plurality of channels to obtain channel location information.

21. A method comprising:
    determining channel location information for a broadband transmission system;
    selecting a first and second local oscillator frequency combination for frequency converting a plurality of channels of the broadband transmission system to fall within a capture bandwidth of a tuner, wherein the selected first and second local oscillator frequencies have a spurious signal associated therewith which falls within the tuner capture bandwidth, and wherein the spurious signal has an attribute sufficient to degrade a signal output by the tuner outside of at least one acceptable tuner performance parameter and thus comprises a relevant spurious signal remaining within the tuner capture bandwidth;

determining a frequency offset between a transmitting source in the broadband transmission system and the tuner;

selecting a frequency shift for at least one of the first and second local oscillator frequencies to dispose the relevant spurious signal between two adjacent channels of the plurality of channels, wherein the selecting a frequency shift uses the channel location information for disposing the relevant spurious signal between the two adjacent channels, and wherein the selecting a frequency shift compensates for the frequency offset; and controlling first and second local oscillators to provide the first and second local oscillator frequencies in accordance with the selected frequency shift to dispose the relevant spurious signal between the two adjacent channels.

22. The method of claim 21, further comprising:
determining a frequency window between channels of broadband transmission system that provides desirable attenuation, wherein the selecting a frequency shift selects a frequency shift to dispose the relevant spurious signal within the frequency window between the two adjacent channels.

23. The method of claim 22, wherein the frequency window comprises a 50 KHz window centered at a midpoint between adjacent traffic channels.

24. The method of claim 21, wherein the determining channel location information comprises:
analyzing cable plant information.

25. The method of claim 21, wherein the determining channel location information comprises:
scanning at least a portion of the plurality of channels to obtain channel location information.

* * * * *